United States Patent
Zhang et al.

(10) Patent No.: US 12,373,420 B2
(45) Date of Patent: *Jul. 29, 2025

(54) DATABASE LOG PERFORMANCE

(71) Applicant: International Business Machines Corporation, Armonk, NY (US)

(72) Inventors: Hong Mei Zhang, Beijing (CN); Shuo Li, Beijing (CN); Xiaobo Wang, Beijing (CN); Sheng Yan Sun, BeiJing (CN)

(73) Assignee: International Business Machines Corporation, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/053,033

(22) Filed: Nov. 7, 2022

(65) Prior Publication Data
US 2023/0062616 A1    Mar. 2, 2023

Related U.S. Application Data

(63) Continuation of application No. 17/348,832, filed on Jun. 16, 2021, now Pat. No. 11,526,490.

(51) Int. Cl.
*G06F 15/16*    (2006.01)
*G06F 16/14*    (2019.01)
*G06F 16/188*   (2019.01)
*G06F 16/23*    (2019.01)

(52) U.S. Cl.
CPC ...... *G06F 16/2365* (2019.01); *G06F 16/148* (2019.01); *G06F 16/188* (2019.01)

(58) Field of Classification Search
None
See application file for complete search history.

(56) References Cited

U.S. PATENT DOCUMENTS

| | | | |
|---|---|---|---|
| 8,909,996 B2 | 12/2014 | Srinivasan | |
| 10,706,009 B2 | 7/2020 | Minh | |
| 10,929,428 B1* | 2/2021 | Brahmadesam | .... G06F 16/2379 |
| 2006/0036660 A1* | 2/2006 | Lynn | ..... G06F 16/2358 |
| 2010/0162247 A1* | 6/2010 | Welc | ......... G06F 9/466 |
| | | | 718/101 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Alex Gofman
(74) *Attorney, Agent, or Firm* — Daniel Yeates

(57) ABSTRACT

A computer-implemented method improves the performance of write ahead logging. The method includes generating a set of query data and a set of log data, where the set of log data is configured to create a write ahead log, and the set of query data is configured to make changes to data in a database. The method also includes writing the set of query data to a virtual file system. The method further includes separating the set of log data into a set of control intervals, where each control interval includes an entry. The method includes writing, each entry into a log buffer, where the writing the set of query data to the virtual file system and the writing each entry into the log buffer are performed in parallel. The method also includes combining each entry into a complete log.

18 Claims, 6 Drawing Sheets

(56) References Cited

U.S. PATENT DOCUMENTS

| | | | |
|---|---|---|---|
| 2010/0205196 A1 | 8/2010 | Schreiber | |
| 2010/0211554 A1* | 8/2010 | Reid | G06F 16/2358 |
| | | | 707/703 |
| 2015/0019516 A1 | 1/2015 | Wein | |
| 2015/0120659 A1* | 4/2015 | Srivastava | G06F 16/27 |
| | | | 707/625 |
| 2015/0254264 A1 | 9/2015 | Yu | |
| 2016/0078085 A1* | 3/2016 | Hu | G06F 16/273 |
| | | | 707/765 |
| 2016/0350353 A1 | 12/2016 | Li | |
| 2018/0300083 A1* | 10/2018 | Volos | G06F 3/0656 |
| 2019/0138621 A1 | 5/2019 | Tobias | |
| 2019/0188097 A1* | 6/2019 | Gupta | G06F 11/3034 |
| 2019/0377821 A1 | 12/2019 | Pleshachkov | |
| 2020/0034042 A1 | 1/2020 | Ma | |
| 2021/0034477 A1* | 2/2021 | Pederson | G06F 11/1471 |

OTHER PUBLICATIONS

Zhang et al., "Improving Database Log Performance", U.S. Appl. No. 17/348,832, filed Jun. 16, 2021, 38 pages.

"List of IBM Patents or Patent Applications Treated as Related", Appendix P, IBM, filed herewith, 2 pages.

* cited by examiner

DATABASE LOG PERFORMANCE

BACKGROUND

The present disclosure relates to database storage, and, more specifically, database log performance with improved write ahead logging.

Database systems can include several processes to ensure that additions to and changes to any database are carried and recorded correctly. Database transactions and systems can be designed using a set of properties to ensure reliability. These are the ACID properties, atomicity, consistency, isolation, and durability. Write-ahead logging (WAL) is a technique for providing atomicity and durability in database systems.

SUMMARY

Disclosed is a computer-implemented method to improve the performance of write ahead logging. The method includes generating a set of query data and a set of log data, where the set of log data is configured to create a write ahead log, and the set of query data is configured to make changes to data in a database. The method also includes writing the set of query data to a virtual file system. The method further includes separating the set of log data into a set of control intervals, where each control interval includes an entry. The method includes writing, each entry into a log buffer, where the writing the set of query data to the virtual file system and the writing each entry into the log buffer are performed in parallel. The method also includes combining each entry into a complete log. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Cloud Computing in General

Figure 1:
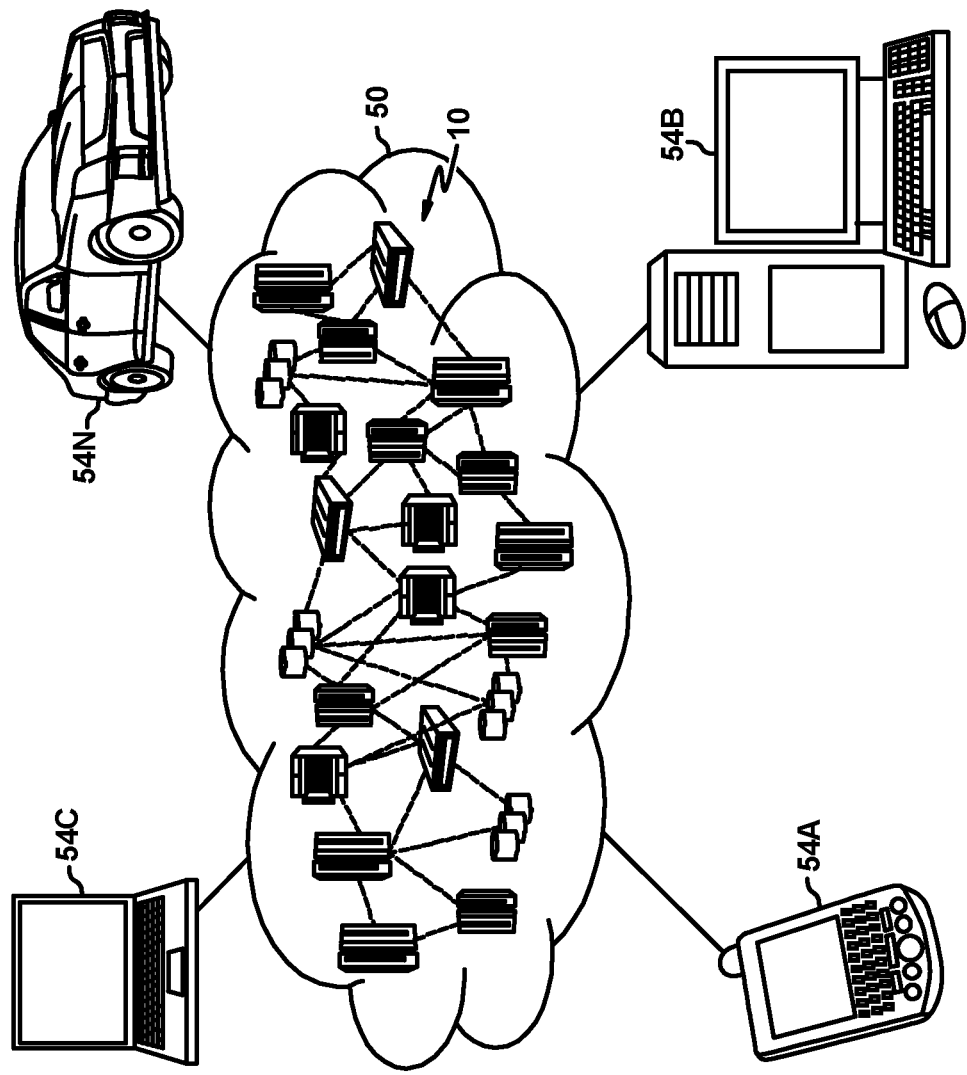
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
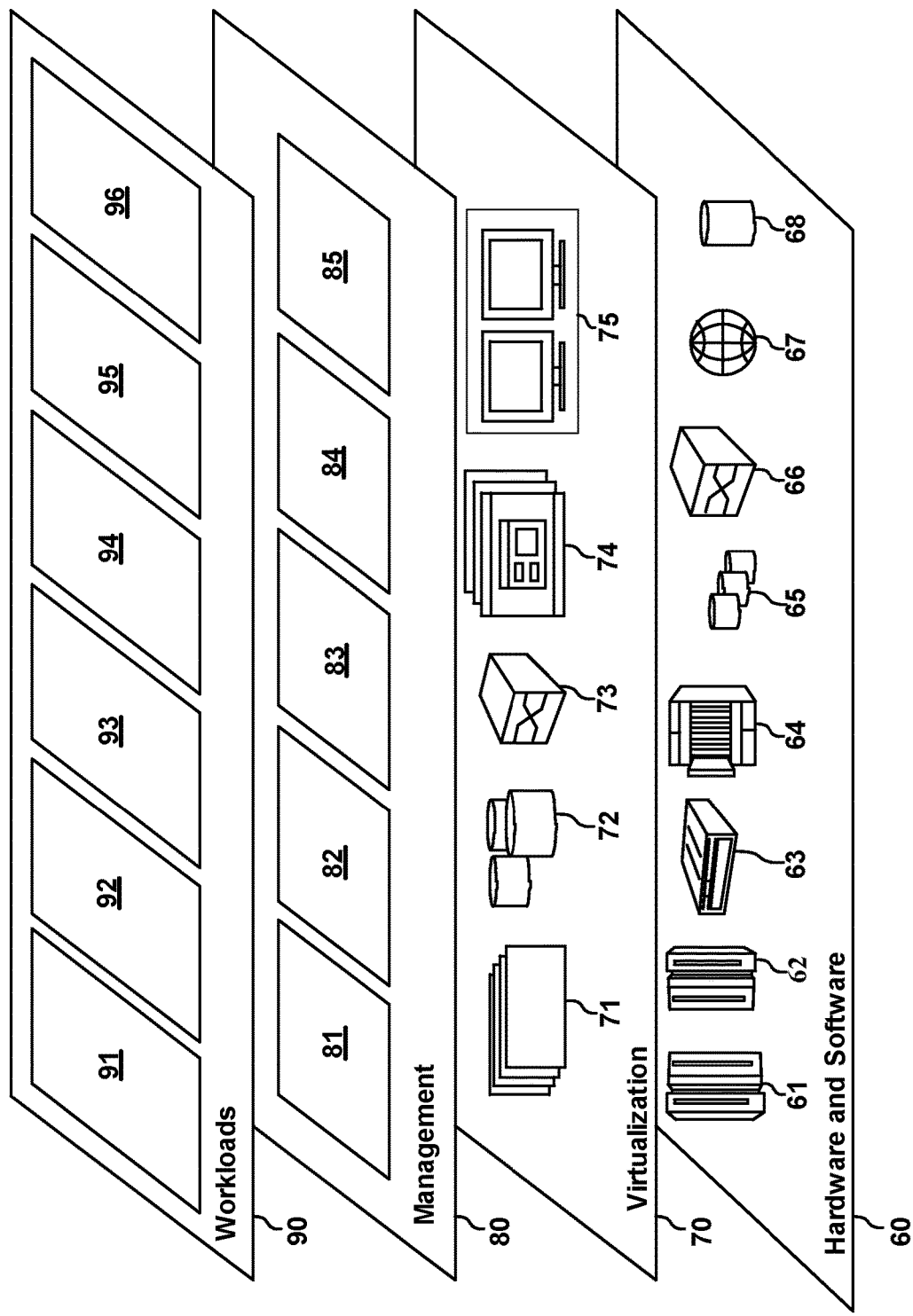
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and improved write ahead logging 96.

Data Processing System in General

Figure 3:
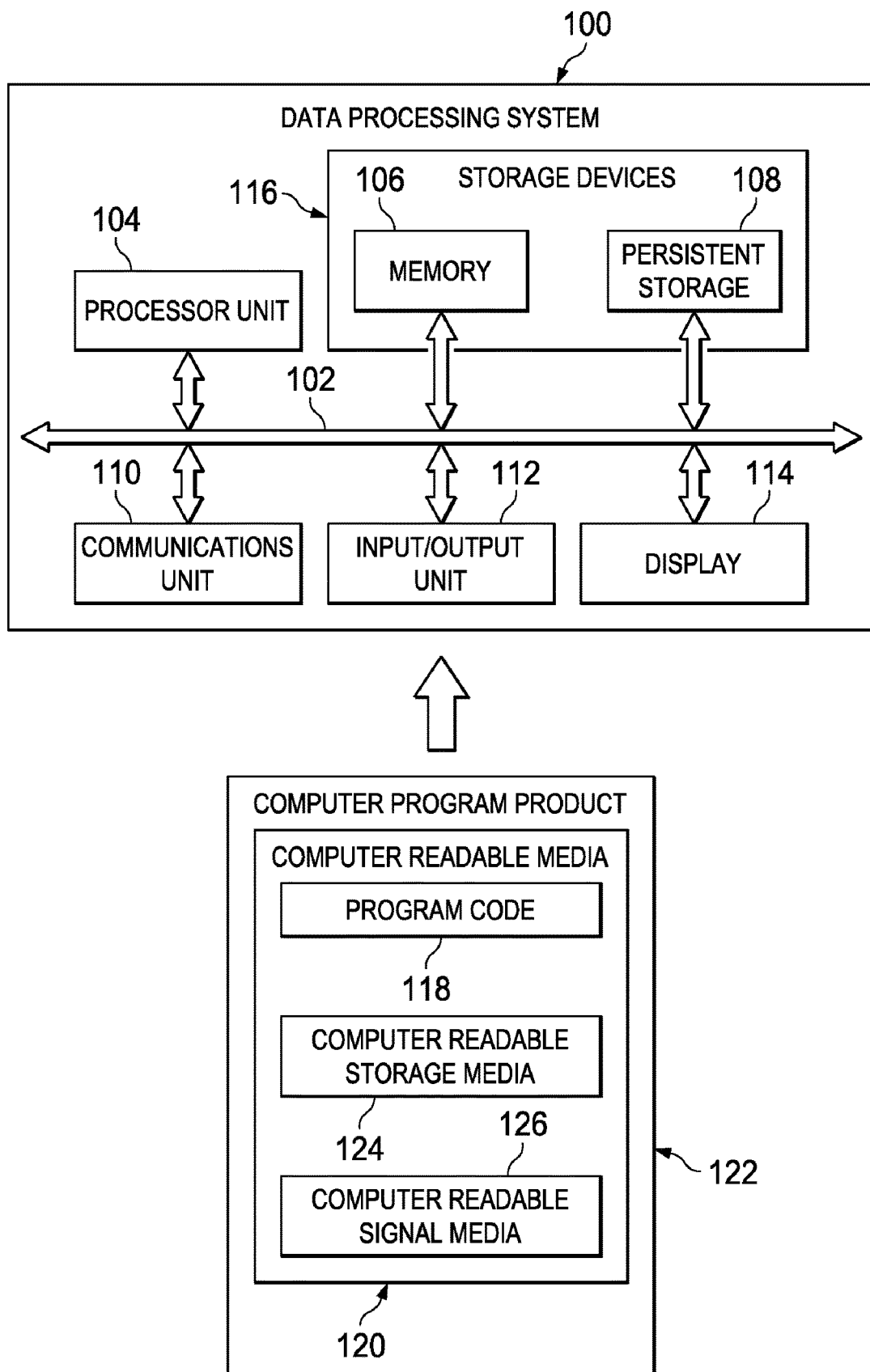
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1.

The present disclosure relates to database storage, and, more specifically, database log performance with improved write ahead logging.

Database systems can include several processes to ensure that additions to and changes to any database are carried and recorded correctly. Database transactions and systems can be designed around a set of properties to ensure reliability. These are the ACID properties, atomicity, consistency, isolation, and durability. Atomicity aims to treat each transaction as a single unit that succeeds completely of fails completely. If any statement in the transaction fails, the entire transaction fails, and the database remains unchanged. This contemplates unforeseen event, such as system failures, errors, and/or crashes during processing of the transaction. Consistency ensures that a transaction only causes a change in the database from one valid state to a second (or subsequent) valid state. Isolation aims to ensure that concurrent execution of different transactions leave the database as if the transactions were performed sequentially. Durability aims to ensure that once a transaction has been committed, it will remain committed even in the case of a system failure.

Write-ahead logging (WAL) is a technique for providing atomicity and durability in databases system. Generally, WAL data starts at the database layer, then to the operation kernel (or kernel), to a block layer, then to the disk (e.g., long term storage). The database system/database layer generates/produces the log of the actions to be performed. The log and the commands are sent from the database system to a virtual file system. The virtual file system separates the log data into control intervals and transfers all data into a buffer for the real file system. The real file system then adds the logs to a general I/O queue. The data is then sent to a disk cache and is written on the disk. In some embodiments, the log data, or the set of log data can be configured to create a write ahead log. The log data can include instruction to create the log and well as the data that will be stored in the log. In some embodiments, the query data, or set of query data, can be configured to make changes to the data in a database. The query data can include the instructions to change (where, how, etc.) that data as well as the new data to enter/alter in the database.

Embodiments of the present disclosure can improve efficiency of WAL. Embodiments of the present disclosure can adjust the WAL process to reduce the overall cost of WAL without any significant decrease in the atomicity and/or durability of the database system.

Embodiments of the present disclosure include a database manager. In some embodiments, the database manager can include/oversee/operate the WAL processes, as well as other database management. In some embodiments, the database manager can write the transaction information directly into the log buffer thereby avoiding a step of writing the log data into the virtual file system. In some embodiments, the writing into the log buffer can be performed in parallel with writing the execution data into the virtual file system and then into the real file system (I/O queue). One advantage of performing these actions in parallel, rather than sequentially, is that they can accelerate/increase input/output (I/O) capability. In some embodiments, parallel can mean performing two function contemporaneously. In some embodiments, there may be a decrease in down time while waiting to write the data into the log buffer and from the log buffer into the I/O queue. Another advantage can be a reduction in the number of times some of the data is copied between different buffers and/or other intermediate storage locations, which may decrease the overall I/O load on the DPS.

In some embodiments, the database manager can write the logs into one or more different log buffers (or queues). In some embodiments, the log data is separated into units called control intervals (CI). Each CI may contain a unit or an entry of the log data. The buffers are a temporary storage space where the data is stored before it is written the disk (or verified written to the disk). The log data can be written into the one or more buffers in parallel. This may provide a reduction in time between the issue of the command by the database system and when then log data is stored in the buffer. In some embodiments, the buffer can include a persistent storage. Thus, the data is readable in the event of a failure to determine if the transaction was correctly processed or not.

In some embodiments, the database manager can map each transaction by using a parent object ID (OID). Mapping to the parent OID can reduce issues associated with cascading as units of a transactions are sent to various buffers.

In some embodiments, the database manager can recombine the one or more log buffers into a single log (or a complete log). The complete log can then be used as if the log was written sequentially. Each entry in each log buffer can be marked with a time stamp and/or other order indicator. The database manager can use the indicators to recombine the log into the proper sequence.

The aforementioned advantages are example advantages, and embodiments exist that can contain all, some, or none of the aforementioned advantages while remaining within the spirit and scope of the present disclosure.

Figure 4:
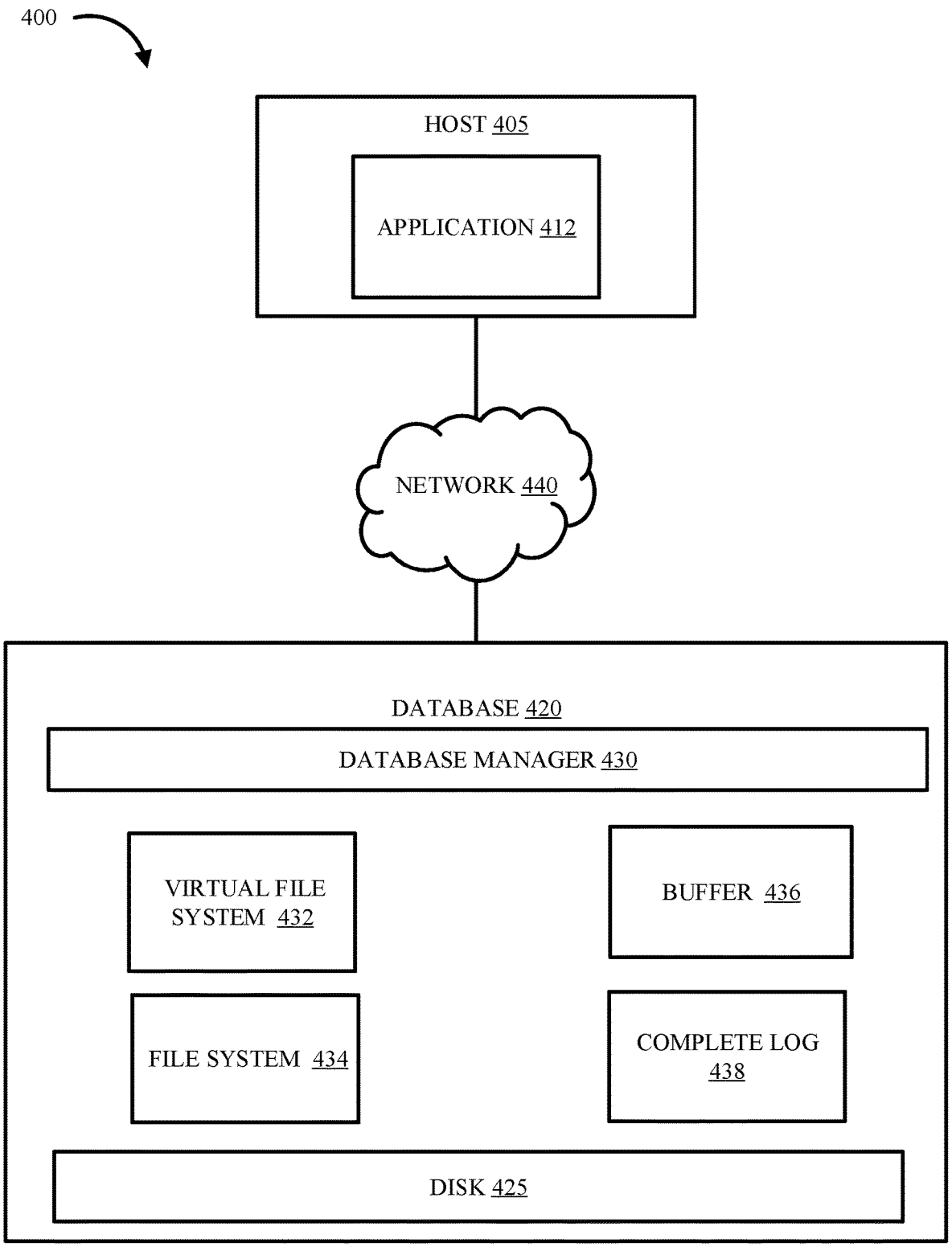
FIG. 4 illustrates a functional diagram of a computing environment suitable for operation of a database manager in accordance with some embodiments of the present disclosure.

Referring now to various embodiments of the disclosure in more detail, FIG. 4 is a representation of a computing environment 400, that is capable of running a database manager in accordance with one or more embodiments of the present disclosure. Many modifications to the depicted environment may be made by those skilled in the art without departing from the scope of the disclosure.

Computing environment 400 includes host 405, database 420, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and/or video information. In general, network 440 may be any combination of connections and protocols that will support communications between and among host 405, database 420, and other computing devices (not shown) within computing environment 400. In some embodiments, each of host 405 and database 420 may include a computer system, such as the data processing system 100 of FIG. 3. In some embodiments, computing environment 400 is part of and/or included in cloud computing environment 50.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50 (shown in FIG. 1). In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410 and application 412.

Application 412 can be any combination of hardware and/or software that is configured to generate a query. A query can be a request for data and/or information stored one or more databases. In some embodiments, the query can include instruction to change (e.g., add, remove, alter, etc.) data in the database. The databases may be local (e.g., on host 405), or remote (e.g., database 420), or a combination of both. In some embodiments, application 412 sends the query to database manager 410. In some embodiments, the queries generated by application 412 can be sent as a batch to database manager 410 and/or database 420. In some embodiments, the queries can be sent on an as need basis and/or continuously. In some embodiments, application 412 is included in database 420. In some embodiments, application 412 can generate/send two or more different queries. In some embodiments, the query is generated in SQL. In some embodiments, application 412 displays the results of the query. The results may be returned in a tabular format, and/or as images, graphs, trends, and/or other similar formats.

Database 420 can be any combination of hardware and/or software configured to store data in a database system. In some embodiments, database 420 is part of a federated database system. A federated database system can include any number databases that appear as a single database to the requesting device (e.g., host 405, application 412, etc.). In some embodiments, database 420 includes two or more databases communicatively connected that can act as a single database. In some embodiments, database 430 may be contained within host 405. In some embodiments, database 420 includes disk 425, database manager 430, virtual file system 432, file system 434 (or real file system), buffer 436, and complete log 438.

Disk 425 can be any combination of hardware and/or software configured to provide long-term storage of data. In some embodiments, disk 425 can include any number of devices separate storage devices. Each device can be the same type of device, may be different types, or may be any combination of devices. The storage devices may include any type of storage medium (e.g., tape drives, hard disk drives (HDD), solid state drives (SSD), flash, etc.). In some embodiments, disk 425 stores all data in database 420. This can include partitions, tables, rows, entries, logs, statistics, and the like. Disk 425 can allow for data to be retrieved, written, and/or changed based on instructions from database manager 430.

Database manager 430 can be any combination of hardware and/or software configured to manage a database. In some embodiments, database manager 430 can receive a query. The query can be received from application 412, host 405, and/or database 420. In some embodiments, database manager 430 can parse, optimize and/or execute the query. In some embodiments, the execution includes retrieving and/or manipulating data on disk 425 according to the query and returning a response to the requestor (e.g., application 412).

In some embodiments, database manager 430 can write the database log (and the WAL) directly into the log buffer. This can bypass writing the data int virtual file system 432 prior to writing the log data in the log CI. In some embodiments, database manager 430 can write the log data into the Log CI and into virtual file system 432 in parallel.

Virtual file system 432 can be any combination of hardware and/or software configured to act as an interface between an application and file system. In some embodiments, the virtual file system 432 can allow application to access different types of file systems. For example, virtual file system 432 can allow the file system of database 420 to access disk 425 even if database 420 runs a different operating system/file system. Said differently, virtual file system 432 can allow a database management system to correctly interface with file system 434. In some embodiments, virtual file system 432 can include a buffer/queue. The buffer can store the log data and/or the CI data while it is waiting to be copied to/sent to the next destination (e.g., file system 434).

File system 434 can be any combination of hardware and/or software configured to manage and organize the files and/or data in a storage medium. In some embodiments, file system 434 can include a general I/O queue. The I/O queue can hold data until it is transferred/written to disk 423.

Buffer 436 can be a temporary storage space to maintain log data while/before it is being written to disk 425. In some embodiments, log buffer 435 is based on a control interval (CI). A CI is a unit of data transmission between two devices. Each CI may include an address to the data and an action to be performed. Each transaction can be separated into one or more CI as the log data is recorded and stored. In some embodiments, buffer 436 can include persistent storage. In some embodiments, buffer 436 can include two or more separate buffer streams. Buffer 436 will be discussed in further detail in FIG. 5.

Log 438 can be a record of all transactions that are to occur in a database. In some embodiments, log 438 can include each unit and each transaction. A transaction can have one or more units. In some embodiments, log 428 is a WAL. Log 438 can be used to determine if a database is in a proper state after an error. In some embodiments, log 438 is stored on disk 425 and/or another persistent storage upstream of disk 424.

Figure 5:
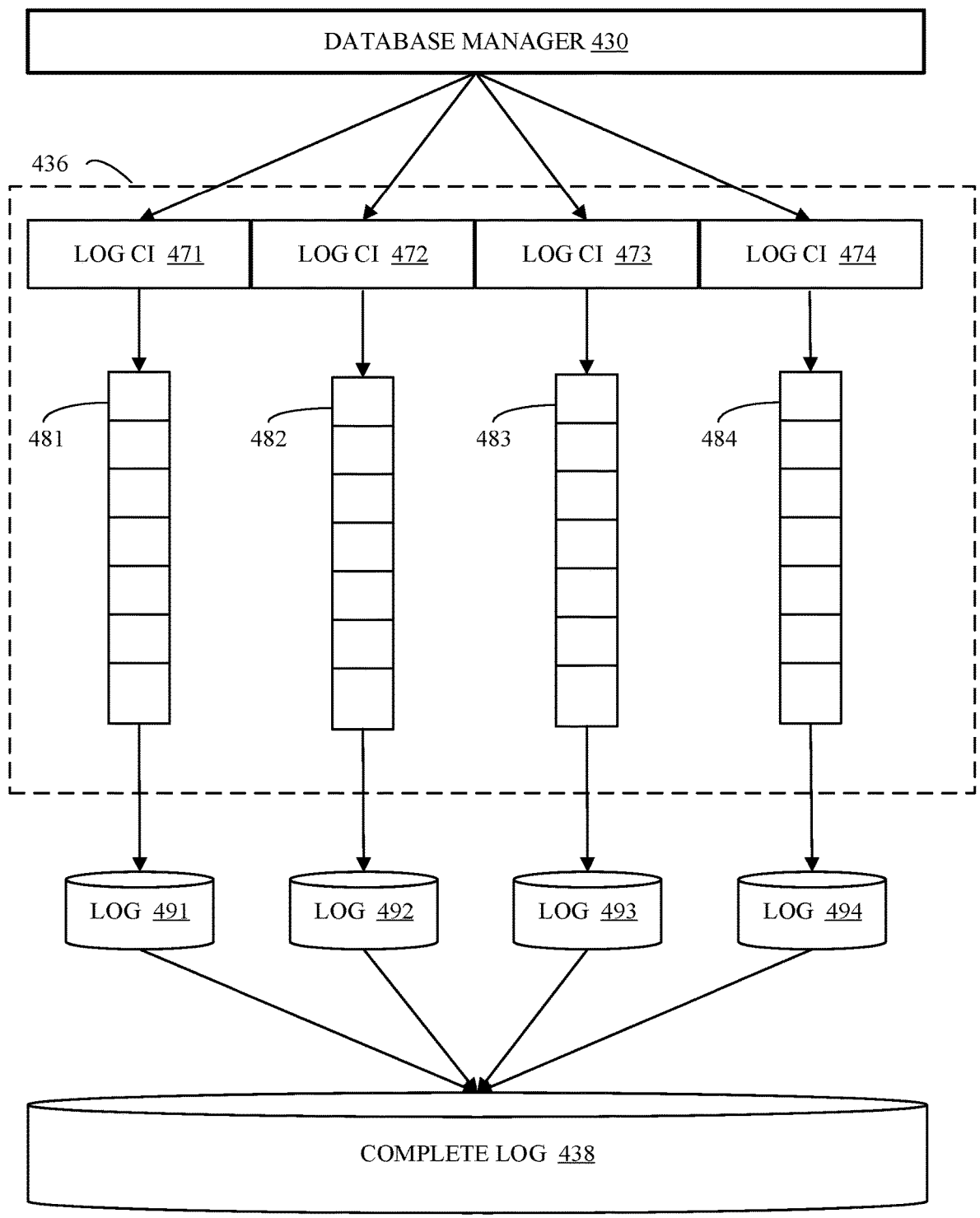
FIG. 5 illustrates a functional diagram of a log buffer in accordance with some embodiments of the present disclosure.

FIG. 5 depicts an expanded view of portions database 420. FIG. 5 includes database manager 430, expanded buffer 436, and complete log 438. FIG. 5 includes database manager 430, disk 425, log CIs 471-474, field programmable gate array (FPGA) 460, FPGA 465, log buffers 481-484, logs 491-494, and complete log 495. Database manager 430 is as described in FIG. 4.

Database manager 430 can send log data directly to one of the logs CI 471-474. Next, the data may be sent from the log CI into one of the log buffers 481-484 corresponding to the matching CI. The data is then transferred, to one of the logs 491-494. The log that receives the data corresponds to a log buffer. For example, log CI 471 is associated with log buffer 481 and log 491. In some embodiments, there can be greater or fewer log CI's, log buffers, and/or logs.

In some embodiments, a field programmable gate array (FPGA) can be used to send data into and out of each log buffer. An FPGA is an integrated circuit that can be uniquely configured. The configuration can occur post-production, and each FPGA can be configured differently. Using FPGAs allows for modification on how specific elements of each transaction are assigned to a specific log buffer. In some embodiments, the log data uses the parent object ID. Using the parent object ID can reduce the cascading, and assist in keeping the data organized.

Each entry into each log can include a sequential marker. The marker can be a time and/or other marker that indicates an order (or relative order) in which the query will be processed. In some cases, the sequence of the log can be misaligned as various portions of the transactions are sent to various log buffers. Database manager 430 can realign the log into the proper sequence. Each entry from logs 491-494 may be transferred to complete log 438. The sequence markers can be used to re-sequence the entire log. In some embodiments, complete log 438 is included in disk 425. In some embodiments, logs 491-494 are included in complete log 438 rather than in buffer 436.

Figure 6:
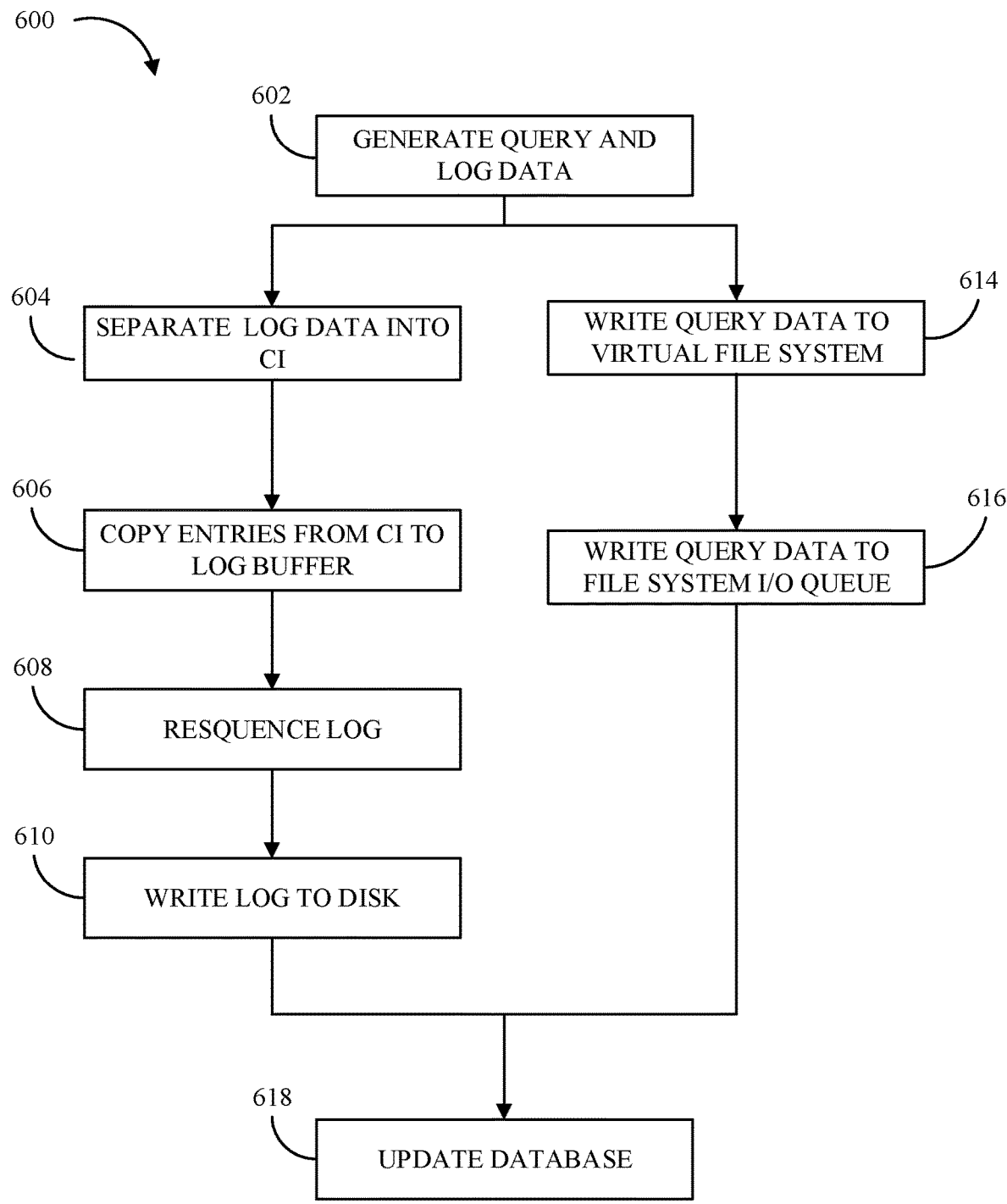
FIG. 6 illustrates a flow chart of an example method to increase the efficiency of write ahead logging, in accordance with some embodiments of the present disclosure.

FIG. 6 depicts a flowchart of an example method, method 600, for writing query transaction log directly into a log CI that can be performed in a computing environment (e.g., computing environment 400 and/or cloud computing environment 50). One or more of the advantages and improvements described above for improved write ahead logging may be realized by method 500, consistent with various embodiments of the present disclosure.

Method 600 can be implemented by one or more processors, host 405, application 412, database 420, disk 425, database manager 430, virtual file system 432, file system 434, log buffer 436, complete log 438, their subcomponents, and/or a different combination of hardware and/or software. In various embodiments, the various operations of method 500 are performed by one or more of: host 405, application 412, database 420, disk 425, database manager 430, virtual file system 432, file system 434, log buffer 436, and complete log 438. For illustrative purposes, the method 500 will be described as being performed by database manager 430.

At operation 602, database manager 430 generates query data and log data. The generated data can be based on a query received from application 412. The log data includes changes to be made to data based on the query. The query data includes the instructions to execute the changes on the database. The log data can be divided into transactions and/or units of the query. In some embodiments, each unit can alter one data element/record.

At operation 604, database manager 430 separates log data into control intervals. Each control interval can include a maximum amount of data. Each CI can include log data, an identifier for the log data, an object ID (OID), and a sequence indicator. The sequence indicator can be a time, a number, and/or any other data used to indicate order as if the transaction were processed in a single buffer. In some embodiments, the OID uses the parent OID for the relevant data point. The parent OID can be the root of the current database object. Utilizing the parent OID rather than current OID can reduce cascading problems.

At operation 606, database manager 430 writes log data entries in a log buffer. In some embodiments, a log data entry is the data contained in one CI. In some embodiments, there are two or more log buffers. Database manager 430 can write to each of the one of more separate log buffers in parallel. In some embodiments, the data written into the buffer includes a sequence marker. In some embodiments, each log buffer includes a log (e.g., log 491). In some embodiments, operation 606 includes writing the entry into the associated log.

At operation 608, database manager 430 can re-sequence/reorder some of or all of the logs for some or all of the log buffers. In some embodiments, the sequence marked is used to sequence the log. At operation 610, database manager 430 writes the sequenced log to disk 425.

At operation 614, database manager 430 sends/writes the query data to virtual file system 432. In some embodiments, query data sent to virtual file system 432 can be processed through a buffer file system 434 and into the I/O queue of the file system to write changes onto disk 425. In some embodiments, virtual file system 432 and associated buffers may not be present. In these embodiments, the query data can be written into file system 434.

At operation 616, database manager 430 sends the query data to the file system's I/O queue. The query data can be held until the transaction is ready to process to the disk. In some embodiments, operations 614 and 616 can be performed in parallel with operation 604, 606, 608, and 610. The parallel performance of these operations may reduce the overall time and cost of using the WAL. Such parallel performance can limit the number of times data is copied. For example, the log data does not have be sent through the various processes of virtual file system 432 and file system 434. In some embodiments, parallel mean both paths of the FIG. 6 are completed contemporaneously.

At operation 618, database manager 430 updates the data in database 420. In some embodiments, the updates can be based on the query data. In some embodiments, the update is performed in response to writing the complete log to the disk (e.g., operation 610). In some embodiments, the update is performed in response to each entry from each log buffer being written into the associated log. This can occur before the log is sequenced.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    generating a set of log data for a query, wherein the generating is configured to create a write ahead log for the query prior to the query making changes in a database, the query is configured to make changes to data in the database, and the creating the write ahead log further comprises:
    writing a set of query data for the query into a virtual file system in parallel with the writing the set of log data in a log buffer;
    separating the set of log data into a set of control intervals, wherein each control interval includes an entry for an address and an action of the query and each control interval is associated with a corresponding portion of the log buffer;
    writing, in response to the separating, the set of log data into the log buffer, wherein the log buffer includes a first log buffer and a second log buffer and the writing into the first log buffer and the second log buffer occurs in parallel; and
    combining, in response to the writing, the set of log data from the first log buffer and the second log buffer into a complete log.

2. The computer-implemented method of claim 1, wherein the first log buffer includes a first log, and the second log buffer includes a second log.

3. The computer-implemented method of claim 2, wherein each entry in the first log buffer is transferred into the first log, and each entry in the second log buffer is transferred into the second log.

4. The computer-implemented method of claim 2, wherein each entry includes a sequence marker, wherein the sequence marker indicates a relative order of operations of the query that are performed.

5. The computer-implemented method of claim 4, wherein the combining of each entry into the complete log further comprises re-sequencing, based on the sequence marker for each entry, all entries into the relative order of operations of the query.

6. The computer-implemented method of claim 5, further comprising:
    storing the complete log on a disk; and
    updating, in response to storing the complete log on the disk, data in the database based on the query data.

7. The computer-implemented method of claim 2, wherein each entry includes a parent object identifier.

8. The computer-implemented method of claim 1, wherein the writing of the log data into the log buffer is configured to reduce a number of copies of the log data.

9. The computer-implemented method of claim 1, wherein each entry uses a parent object identifier to identify an associated database object.

10. The method of claim 1, further comprising:
    updating the database, wherein the update occurs after the writing the set of log data into the log buffer and before the combining the set of log data into the complete log.

11. A system comprising:
    a processor;
    a database;
    a write ahead log that includes two or more log buffers and the write ahead log is configured to write entries into the two or more log buffers in parallel; and
    a computer-readable storage medium communicatively coupled to the processor and storing program instructions which, when executed by the processor, are configured to cause the processor to:
    generate a set of log data from a query, wherein the query is configured to make updates to data in a database, wherein the generating is configured to create the write ahead log prior to the query applying the updates to the database, and wherein the program instructions for creating the write ahead log further comprise program instructions to:

write a set of query data for the query into a virtual file system in parallel with the writing the set of log data into the two or more log buffers;

separate the set of log data into a set of control intervals, wherein each control interval includes an entry for an address and an action of the query and each control interval is associated with a corresponding portion of a log buffer;

write, in response to the separating, the set of log data into the log buffer, wherein the writing into the two or more log buffers occurs in parallel; and combine, in response to the writing the set of log data from a first log buffer and a second log buffer into the log buffer, the set of log data into a complete log.

12. The system of claim 11, wherein the first log buffer includes a first log where each entry in the first log buffer is transferred into the first log, and the second log buffer includes a second log where each entry in the second log buffer is transferred into the second log.

13. The system of claim 12, wherein each entry includes a sequence marker, wherein the sequence marker indicates a relative order of operations of the query are performed.

14. The system of claim 13, wherein the combining of each entry into the complete log further comprises re-sequencing into the relative order of operations of the query based on the sequence marker for each entry.

15. A computer program product, the computer program product comprising a computer readable storage medium having program instructions embodied therewith, the program instructions executable by a processing unit to cause the processing unit to:

generate a set of log data for a query, wherein the set of log data is configured to create a write ahead log, and the query is configured to make changes to data in a database;

separate the set of log data into a set of control intervals, wherein each control interval includes an entry for an address and an action of the query and each control interval is associated with a corresponding portion of a log buffer;

write the set of log data into the log buffer, wherein the log buffer includes a first log buffer and a second log buffer and the writing into the first log buffer and the second log buffer occurs in parallel and writing a set of query data for the query into a virtual file system occurs in parallel with the writing the set of log data into the log buffer; and combine, in response to the writing the set of log data from the first log buffer and the second log buffer into the log buffer, the set of log data into a complete log.

16. The computer program product of claim 15, wherein the first log buffer includes a first log where each entry in the first log buffer is transferred into the first log, and the second log buffer includes a second log where each entry in the second log buffer is transferred into the second log.

17. The computer program product of claim 16, wherein each entry includes a sequence marker, wherein the sequence marker indicates a relative order of operations of the query are performed.

18. The computer program product of claim 17, wherein the combining of each entry into the complete log further comprises re-sequencing into the relative order of operations of the query based on the sequence marker for each entry.

* * * * *